(12) United States Patent
Corradini et al.

(10) Patent No.: US 9,403,325 B2
(45) Date of Patent: Aug. 2, 2016

(54) MACHINE FOR WINDING A FIBROUS MATERIAL ENABLING ALIGNMENT AND OFF-CENTERING CONTROL BY IMAGE ANALYSIS

(71) Applicant: SNECMA, Paris (FR)

(72) Inventors: Sylvain Corradini, Moissy-Cramayel (FR); Richard Mathon, Moissy-Cramayel (FR); Jean-François Durand, Baraqueville (FR); Bertrand Pierre Martin Leroyer, Moissy-Cramayel (FR); Antoine Phelippeau, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/428,495

(22) PCT Filed: Sep. 11, 2013

(86) PCT No.: PCT/FR2013/052082
§ 371 (c)(1),
(2) Date: Mar. 16, 2015

(87) PCT Pub. No.: WO2014/041295
PCT Pub. Date: Mar. 20, 2014

(65) Prior Publication Data
US 2015/0239181 A1 Aug. 27, 2015

(30) Foreign Application Priority Data

Sep. 17, 2012 (FR) ...................................... 12 58678
Apr. 26, 2013 (FR) ...................................... 13 53886

(51) Int. Cl.
*B32B 41/00* (2006.01)
*B29C 70/38* (2006.01)
(Continued)

(52) U.S. Cl.
CPC ........... *B29C 70/382* (2013.01); *B29C 53/8041* (2013.01); *B29C 70/32* (2013.01);
(Continued)

(58) Field of Classification Search
CPC ...... B29C 70/32; B29C 70/24; B29C 70/443; B29C 53/582; B29C 53/8066; B29C 53/562; B29C 70/48; Y10T 442/20; B65H 23/0328; Y10S 428/902

USPC ........... 156/64, 173, 189, 350, 351, 363, 367, 156/378, 379, 429, 431, 446, 449, 457, 458
See application file for complete search history.

(56) References Cited

U.S. PATENT DOCUMENTS

| 5,436,980 A * | 7/1995 | Weeks et al. ................. 382/141 |
| 2009/0098337 A1 | 4/2009 | Xie et al. |
| 2010/0159762 A1* | 6/2010 | Laurent et al. ................. 442/59 |

FOREIGN PATENT DOCUMENTS

| EP | 1 961 923 A2 | 8/2008 |
| EP | 2 199 069 A1 | 6/2010 |

(Continued)

OTHER PUBLICATIONS

International Search Report as issued in International Patent Application No. PCT/FR2013/052082, dated Feb. 13, 2014.

*Primary Examiner* — Michael N Orlando
*Assistant Examiner* — Joshel Rivera
(74) *Attorney, Agent, or Firm* — Pillsbury Winthrop Shaw Pittman LLP

(57) ABSTRACT

A winding machine for winding a fiber texture onto an impregnation mandrel, includes: a take-up mandrel for storing and unwinding a fiber texture, the take-up mandrel having a substantially horizontal axis of rotation; an impregnation mandrel for receiving superposed layers of the fiber texture unwound from the take-up mandrel, the impregnation mandrel having an axis of rotation that is substantially horizontal and parallel to the axis of rotation of the take-up mandrel; a camera directed towards the fiber texture and the impregnation mandrel to examine the passage of warp tracer yarns and weft tracer yarns present in the fiber texture; an image-analysis module for determining the positions of the intersections of warp tracer yarns with the successive weft tracer yarns and comparing these determined positions with corresponding positions for the intersections of reference warp and weft tracer yarns, and determining an offset value for the fiber texture for each of these intersections; electric motors for driving the mandrels in rotation about their respective axes of rotation; and a control unit for controlling the electric motors for driving rotation of the mandrels.

11 Claims, 6 Drawing Sheets

(51) Int. Cl.
    *B29C 53/80*     (2006.01)
    *B65H 23/032*     (2006.01)
    *B29C 70/32*     (2006.01)
    *B65H 18/00*     (2006.01)
    *B29C 70/54*     (2006.01)
    *B29C 70/56*     (2006.01)
    *B29C 53/56*     (2006.01)
    *B29C 53/82*     (2006.01)
    *B29K 63/00*     (2006.01)
    *B29K 79/00*     (2006.01)
    *B29K 307/04*     (2006.01)
    *B29L 31/30*     (2006.01)

(52) U.S. Cl.
    CPC ................ B29C 70/38 (2013.01); B29C 70/54 (2013.01); B29C 70/56 (2013.01); B65H 18/00 (2013.01); B65H 23/0328 (2013.01); *B29C 53/56* (2013.01); *B29C 53/8075* (2013.01); *B29C 53/825* (2013.01); *B29C 2053/8025* (2013.01); *B29K 2063/00* (2013.01); *B29K 2079/08* (2013.01); *B29K 2307/04* (2013.01); *B29L 2031/3076* (2013.01); *B65H 2301/3611* (2013.01); *B65H 2403/52* (2013.01); *B65H 2553/42* (2013.01); *B65H 2557/51* (2013.01); *B65H 2557/62* (2013.01); *B65H 2701/172* (2013.01); *B65H 2701/174* (2013.01); *B65H 2701/177* (2013.01)

(56) References Cited

FOREIGN PATENT DOCUMENTS

| | | |
|---|---|---|
| FR | 2 496 716 A1 | 6/1982 |
| FR | 2 953 225 A1 | 6/2011 |
| WO | WO 2012/140355 A1 | 10/2012 |

\* cited by examiner

MACHINE FOR WINDING A FIBROUS MATERIAL ENABLING ALIGNMENT AND OFF-CENTERING CONTROL BY IMAGE ANALYSIS

CROSS REFERENCE TO RELATED APPLICATIONS

This application is the U.S. National Stage of PCT/FR2013/052082 filed Sep. 11, 2013, which in turn claims priority to French Application No. 1258678, filed Sep. 17, 2012 and French Application No. 1353886, filed Apr. 26, 2013. The contents of both applications are incorporated herein by reference in their entirety.

BACKGROUND OF THE INVENTION

The present invention relates to the general field of making gas turbine casings out of composite material, and it relates more particularly to gas turbine fan retention casings for aeroengines.

It is common practice for a fan retention casing to be made up firstly of a relatively thin wall defining the air inlet passage into the aeroengine and supporting an abradable material in register with the path followed by the tips of the fan blades, and also supporting an acoustic treatment coating, if any, and secondly of a shield structure that is fastened to said wall on the outside, around the fan, so as to retain debris such as ingested objects or fragments of damaged blades in the event of them being thrown outwards by centrifuging, in order to prevent them from passing through the casing and reaching other portions of the aircraft.

Proposals have already been made for making a fan retention casing out of composite material. By way of example, reference may be made to Document EP 1 961 923, which describes fabricating a casing out of composite material of varying thickness, by forming fiber reinforcement out of superposed layers of a fiber texture and densifying the fiber reinforcement with a matrix. More precisely, that document makes provision for using a take-up mandrel for three-dimensional weaving of the fiber texture, which texture is then wound as superposed layers onto an impregnation mandrel having a profile corresponding to the profile of the casing that is to, be made. The fiber preform as obtained in that way is held on the impregnation mandrel and is impregnated with resin prior to polymerizing the resin.

In practice, performing that method raises the problem of transferring the fiber texture from the take-up mandrel to the impregnation mandrel and of controlling the position of the fiber texture during winding. Indeed, any drift of the position of the fiber texture during winding would result in localized departures from tolerance concerning tension, offset, and fiber density and that would then make the fiber texture unusable.

Moreover, the casing is made by winding several turns around the preform (typically four), which means that, after winding, it is not possible to inspect the positions of warp tracers (used for monitoring alignment) for those successive turns. It is thus imperative to ensure correct positioning of the fiber texture during winding, and also to have an inspection report after winding, making it possible to certify that the fiber texture complies with specifications, which means that it is also necessary to ensure full control over offset of the fiber texture in real time.

Consequently, there exists a need to have a winding machine that makes it possible, during the transfer of the fiber texture from the take-up mandrel to the impregnation mandrel, to ensure both that the fiber texture is correctly placed and applied on the impregnation mandrel and that the alignment of the fiber texture is controlled in real time and possibly offset. Indeed, after winding, it is impossible to verify the position and the offset of the fiber texture and it is thus impossible to validate the winding operation.

OBJECT AND SUMMARY OF THE INVENTION

The main object of the present invention is thus to mitigate such a need. Another object of the invention is to enable data to be analyzed statistically in order to monitor the quality of the winding operations. These objects are achieved by providing a machine for winding a fiber texture on an impregnation mandrel, the machine comprising:
  a take-up mandrel for storing and unwinding a fiber texture, the take-up mandrel having a substantially horizontal axis of rotation;
  an impregnation mandrel for receiving superposed layers of the fiber texture unwound from the take-up mandrel, the impregnation mandrel having an axis of rotation that is substantially horizontal and parallel to the axis of rotation of the take-up mandrel;
  a camera directed towards the fiber texture and the impregnation mandrel in order to examine the passage of warp tracer yarns and weft tracer yarns incorporated in the fiber texture;
  an image-analysis module for initially determining the positions of the intersections of warp tracer yarns with the successive weft tracer yarns and then comparing these determined positions with corresponding theoretical positions of intersections of reference warp and weft tracer yarns as detected, during a calibration stage prior to automatic winding of said fiber texture, by said camera acting on a calibration mandrel marked with reference warp and weft tracer yarns, and as recorded in the module, and finally, for determining an offset value for the fiber texture for each of these intersections;
  electric motors for driving the mandrels in rotation about their respective axes of rotation; and
  a control unit for controlling the electric motors for driving rotation of the mandrels.

Thus, by analyzing an image of the fiber texture in real time, it is possible to monitor offset and misalignment, if any, of the preform, and if need be to cancel the winding operation after it has been carried out.

This provides a winding machine that is well adapted to making fan retention casings out of composite material for an aeroengine. In particular, the operation of the machine can be fully automated, thereby contributing to reducing the fabrication cycle time of such casings.

Preferably, the control unit for controlling the electric motors includes monitoring means for monitoring the tension of the fiber texture. In fact, this tension can be measured by a sensor or by measuring electricity consumption. By monitoring this tension, and as a function of the nature of the fiber texture, it is thus possible to determine and to control the density of fibers in the resulting preform.

Also preferably, the camera is mounted in a light box that is adjusted to the profile of said impregnation mandrel and placed as close as possible to said fiber texture and the image-analysis module further determines a position error between a reference alignment position and the position observed by the camera of at least one warp tracer yarn and optionally allows continuation of winding depending on whether or not the observed position of the tracer yarn remains within a predetermined tolerance range. Advantageously, alignment is corrected during the winding operation by correcting the position of the take-up mandrel when the given position error is greater than 25% of the predetermined tolerance range, the position of the take-up mandrel is corrected by a motorized wormscrew secured to this take-up mandrel Depending on the embodiment envisaged, initial alignment (calibration) of the machine of the invention may be implemented either with calibration equipment or with laser-projection equipment. Calibration equipment is marked with reference warp and weft tracer yarns designed to be detected by said camera during a calibration stage prior to automatic winding of said fiber texture. Laser-projection equipment projects at least one reference tracer warp yarn onto the fiber structure, and thus makes it possible for an operator firstly to align the take-up mandrel on the impregnation mandrel before winding the fiber texture on the impregnation mandrel and secondly to monitor misalignment of the take-up mandrel on the impregnation mandrel during the winding operation.

Advantageously, the laser-projection equipment is arranged substantially vertically above the take-up mandrel and may be mounted on a cross-beam supported by a support structure of the machine, reflective targets being positioned on the impregnation mandrel so as to enable location in three dimensions and allow projection of at least one reference tracer warp yarn to be projected before and during the winding operation. Preferably, there are at least six reflective targets and they are distributed in the thickness of two cheek-plates of the impregnation mandrel.

The invention also provides a method of determining an offset value of for a fiber texture wound in superposed layers onto a second mandrel of a machine including a first mandrel for storing and unwinding said fiber texture, the first mandrel having an axis of rotation that is substantially horizontal and parallel to an axis of rotation of the second mandrel, and the first and second mandrels being driven about their respective axes of rotation by electric motors actuated by a control unit; in which method a camera directed towards the fiber texture and the second mandrel examines the passage of warp tracer yarns and weft tracer yarns that are present in the fiber texture and an image-analysis module firstly determines the positions of the intersections of the warp tracer yarns with the successive weft tracer yarns and then compares these determined positions with corresponding theoretical positions of the intersections of reference warp and weft tracer yarns, detected during a calibration stage prior to automatic winding of said fiber texture, by said camera on a calibration mandrel marked with reference warp and weft tracer yarns and recorded in the module, and finally, determines an offset value for the fiber texture for each of these intersections.

Depending on the embodiment envisaged, said first and second mandrels are respectively take-up mandrels and impregnation mandrels for a winding machine, or a pull mandrel and a take-up mandrel for a weaving machine (or loom).

BRIEF DESCRIPTION OF THE DRAWINGS

Other characteristics and advantages of the present invention appear from the description given below with reference to the accompanying drawings, which show embodiments having no limiting character and in which.

DETAILED DESCRIPTION OF EMBODIMENTS

The invention is described below in the context of its application to fabricating a fan retention casing for a gas turbine aeroengine, an embodiment of which is described in Document EP 1 961 923, to which reference may be made.

The casing is made of a composite material comprising fiber reinforcement densified by a matrix. By way of example, the fiber reinforcement is made of carbon, glass, aramid, or ceramic fibers, and the matrix is made of a polymer, e.g. an epoxy, a bismaleimide, or a polyimide resin.

Briefly, the method of fabrication described in that document consists in making a fiber texture by three-dimensional weaving with warp take-up onto a drum (referred to below as a take-up mandrel) having a profile that is determined as a function of the profile of the casing to be fabricated. Once woven, this fiber texture or preform is similar to a dry mat.

The fiber texture as made in this way is unwound from the take-up mandrel to be subsequently transferred and wound over several turns (typically four turns plus a fraction of a turn less than ¼ of a turn) onto the mandrel of a resin injection mold (referred to below as the impregnation mandrel) of outside profile corresponding to the inside profile of the casing to be fabricated.

With the fiber texture held on the impregnation mandrel, impregnation is then performed using a resin. For this purpose, a covering made by joining together a plurality of pieces is applied to the fiber texture and the resin is injected into the mold as constituted in this way. Impregnation may be assisted by establishing a pressure difference between the inside and the outside of the mold containing the fiber texture. After impregnation, a step is performed of polymerizing the resin.

Figure 1:
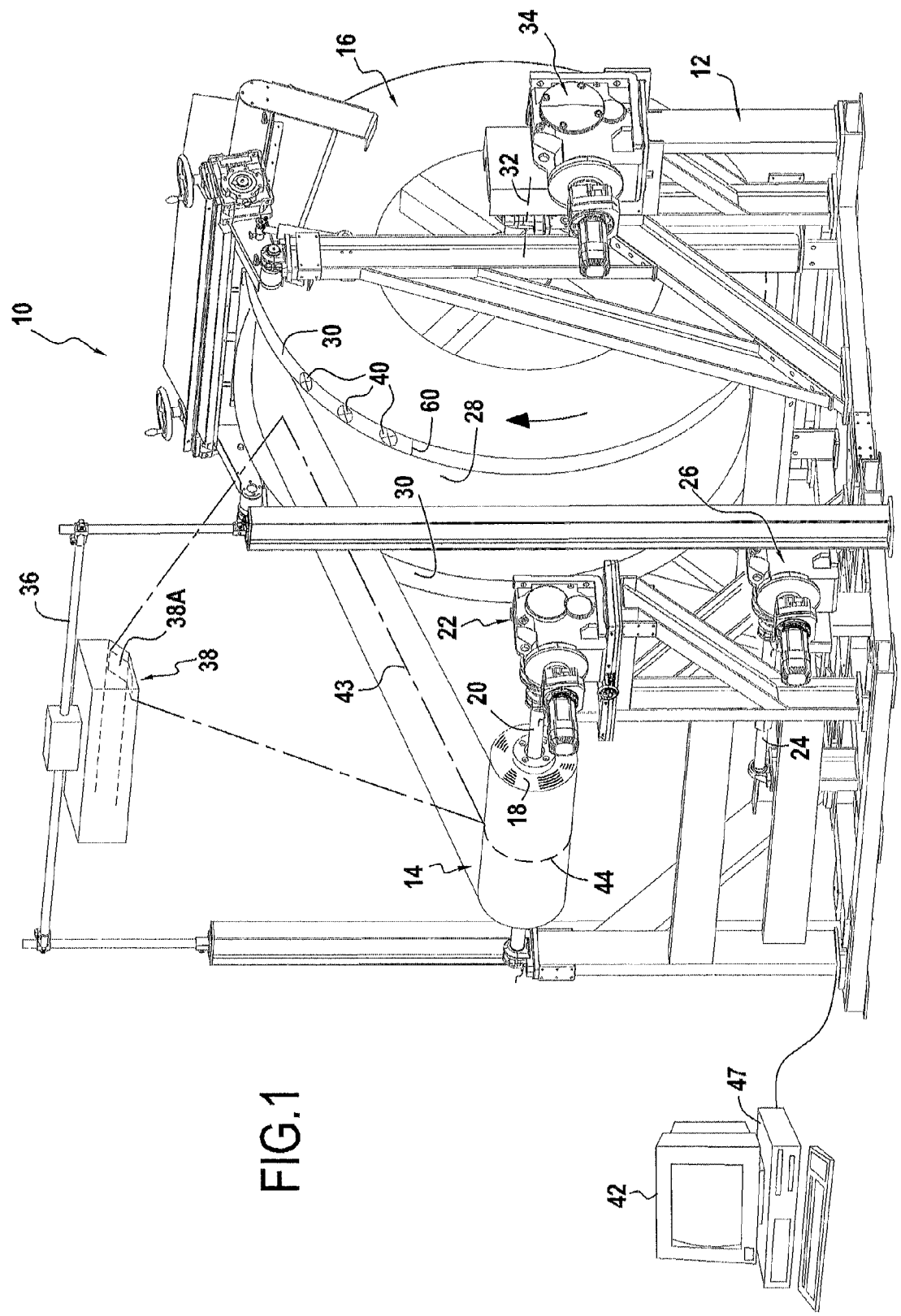
FIG. 1 is a perspective view of a winding machine constituting a first embodiment of the invention.
Figure 2:
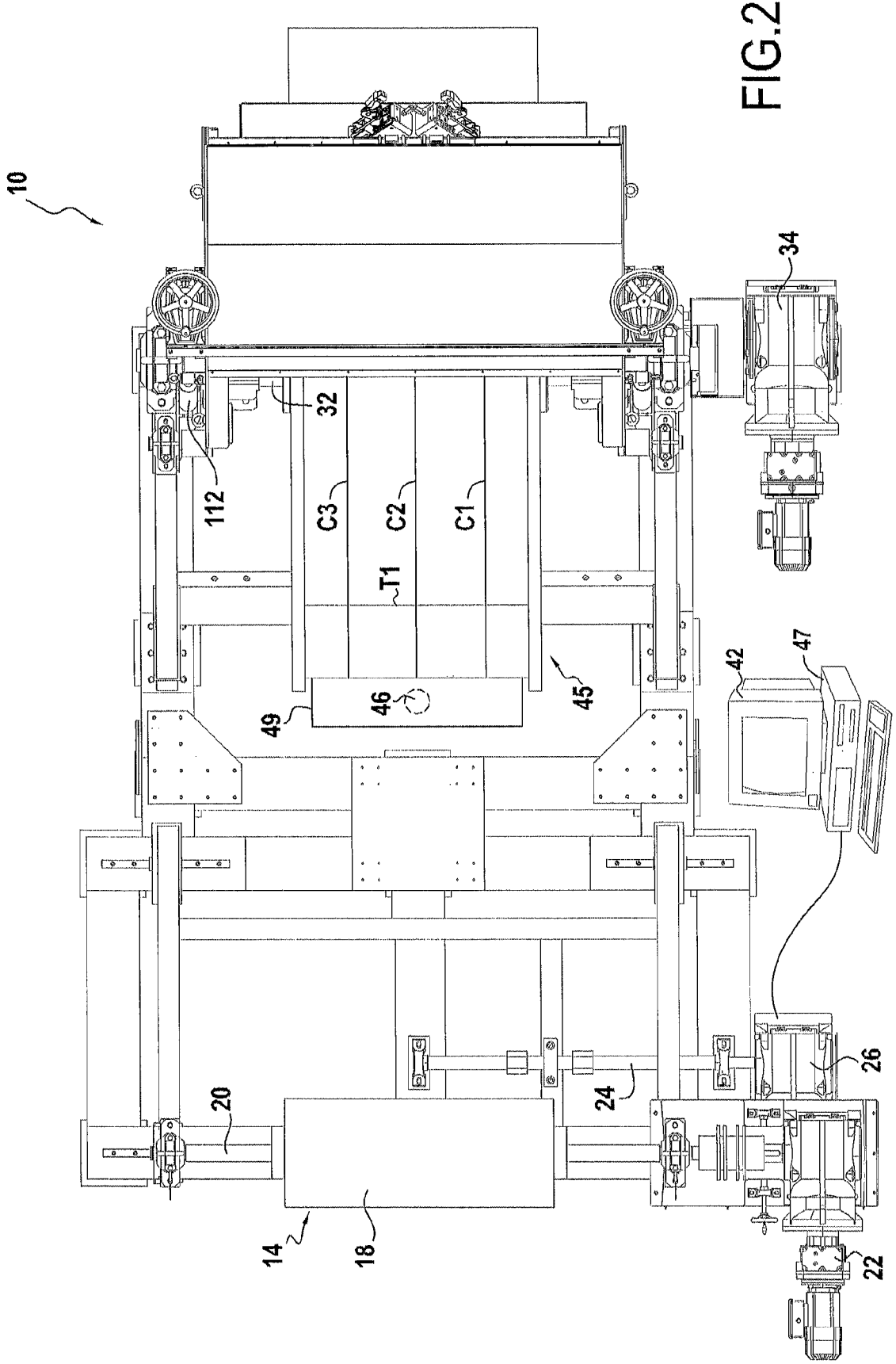
FIG. 2 is a perspective view of a winding machine constituting a second embodiment of the invention.

The winding machine shown in FIGS. 1 and 2 and constituting the subject matter of the invention serves to perform automated transfer of the fiber texture stored on the take-up mandrel to the impregnation mandrel of the resin injection mold, while at the same time ensuring control in real time of the alignment and of possible offset of said fiber texture.

It should be observed that this winding machine does not apply only to fiber textures obtained exclusively by three-dimensional weaving as described below.

The winding machine 10 of the invention comprises a support structure 12 supporting in particular a take-up mandrel 14 and an impregnation mandrel 16. These mandrels are removable, i.e. they may be separated from the support structure. The take-up mandrel 14 receives the fiber texture 18 obtained by three-dimensional weaving. It is carried by a horizontal shaft of axis 20 having one end rotatably mounted on the support structure 12 of the winding machine and having its other end coupled to the outlet shaft of an electric motor 22, e.g. an alternating current (AC) electric gear motor.

The assembly constituted by the take-up mandrel 14, its shaft of axis 20, and its electric motor 22 can move in translation relative to the support structure along the axis of rotation of the take-up mandrel. To do this, a rod 24 of the wormscrew type is coupled to the output shaft of an electric motor 26, e.g. an AC electric gear motor, and has one end fastened to the support structure 12 of the winding machine and its other end is secured to the take-up mandrel 14. This degree of freedom for the take-up mandrel to move in translation makes it possible to bring the mandrel into alignment with the impregnation mandrel prior to winding the fiber texture onto the impregnation mandrel, and also during winding.

The impregnation mandrel 16 of the winding machine of the invention is to receive superposed layers of the fiber texture unwound from the take-up mandrel. It presents an outside surface 28 of profile corresponding to the profile of the inside surface of the casing that is to be made, together with two side plates 30.

The impregnation mandrel is carried by a horizontal shaft of axis 32 that is parallel to the axis of rotation 20 of the take-up mandrel and that has one end rotatably mounted on the support structure 12 of the winding machine and its other end coupled to the outlet shaft of an electric motor 34, e.g. an AC electric gear motor.

A control unit 42 is connected to the electric motors 22, 26, and 34 of the two mandrels 14, 16 and of the wormscrew 24 in order to control and monitor the speed of rotation of each mandrel, as well as the movement in translation of the take-up mandrel. More generally, the control unit makes it possible to govern all of the operating parameters of the winding machine, both when putting the fiber texture in place (calibration stage) and then during winding (automatic control stage), as described below.

In the embodiment envisaged, the winding machine may be calibrated by means of laser-projection equipment as shown in FIG. 1 or by means of calibration equipment as shown in FIG. 2.

In the first embodiment, the support structure 12 of the winding machine 10 can support a cross-beam 36 on which laser-projection equipment 38 is mounted in stationary manner, substantially vertically above the take-up mandrel. It should be noted however, that this equipment could equally well be installed on the ceiling of the workshop receiving the winding machine, provided the equipment is arranged above said machine. Reflective targets 40 are fastened in the thickness of the two side plates 30 of the impregnation mandrel 16 to co-operate with the laser-projection equipment. There are six in order to make locating in three-dimensions possible, and in association with these targets, this laser-projection equipment makes it possible to ensure that the take-up mandrel is automatically aligned with the impregnation mandrel prior to winding the fiber texture onto the impregnation mandrel, and it also enables the operator to monitor the alignment during winding.

More precisely, this laser-projection equipment is present in the known form of an elongate unit comprising a controlled intensity laser source having a beam that passes through optical collimator means in order to reach two mirror scanner devices (digital micromirror devices, DMD) arranged, one along the axis of said beam, and the other perpendicularly thereto, which devices redirect said beam through an outlet port 38A towards the fiber texture to form a light spot that is determined in compliance with an order given by the control unit 42 concerning each of the mirrors of the devices and that is measured by an optical sensor of the equipment. Thus, although at any instant, the equipment projects only one light spot, because of the high speed of movement of the mirrors (typically once every 100 microseconds), there may appear either what looks like a continuous line on the fiber texture on the basis of which the sought-after initial automatic alignment may therefore be performed, or else what looks like a plurality of lines for enabling an operator to monitor this alignment during winding. By way of example, such projection equipment is available from the Canadian supplier VIRTEK.

The initial alignment of the take-up mandrel 14 on the impregnation mandrel 16 before automatic winding of the fiber texture proceeds as follows.

First of all, it is necessary to put the six reflective targets 40 into place on the impregnation mandrel 16, more precisely on its side plates 30, in order to enable the laser-projection equipment 38 to detect automatically the position in three dimensions of the impregnation mandrel during start-up of the equipment. Said start-up causes the mirror devices of the laser-projection equipment to move until its laser beam has been aligned in succession on each target in order to ensure they are located. Once the targets have been accurately located, the three dimensional position of the impregnation mandrel is fully known to the laser-projection equipment that can then project an alignment reference line 43 onto the fiber texture that includes a particular warp yarn 44 (called a "tracer" yarn) that is woven together with the carbon fibers of the preform and that the operator causes to coincide with the reference line as projected during the initial setting-up of the fiber texture on the impregnation mandrel. If necessary, the take-up mandrel 14 is moved in translation along its axis of rotation by actuating the electric motor 26 or by actuating a handle, if any. Once the take-up mandrel has been correctly aligned on the impregnation mandrel, the free end of the fiber texture on the take-up mandrel is fastened by the operator onto the impregnation mandrel so that it is then possible to initiate the stage of automatically controlling winding.

In the second embodiment of FIG. 2, calibration is no longer carried out by laser projection but by simulating tracer yarns. To do this, calibration equipment, of shape identical to the impregnation mandrel but having on its surface the reference lines C1, C2, C3, T1 representing the sought-after theoretical positions of the tracer yarns, is arranged in the place of the impregnation mandrel and a camera 46 pointing towards said calibration equipment (or calibration mandrel 45) and advantageously arranged on a post 48 extending from the base of the support structure 12, has the task of recording images of the calibration mandrel and of detecting the reference lines in the images in order to provide a display on the monitor screen of the control unit 42. Once this calibration stage is over, the impregnation mandrel can replace the calibration mandrel and the free end of the fiber texture extracted from the take-up mandrel is fastened by the operator on the impregnation mandrel.

Whatever the type of calibration selected, the electric motors for turning the take-up and impregnation mandrels are then activated and governed by the control unit 42 in order to activate the automatic winding process in superimposed layers of the fiber texture on the impregnation mandrel while applying sufficient winding tension to the fiber texture.

For this purpose, a setpoint tension is predefined as a function in particular of the nature of the fiber texture, and it is applied to that one of the mandrels that offers torque opposing the winding, i.e. generally the take-up mandrel. More precisely, the setpoint tension is input into the control unit, which converts it into a setpoint value for the induction current of the electric motor of the take-up mandrel by using an appropriate calculation algorithm. The tension that is actually applied can be measured by sensors of type that is known, such as roller sensors, mounted on follower rollers that are arranged for example between the take-up mandrel and the impregnation mandrel or by a control of the current of induction of the electric motor of the take-up mandrel.

The calculation algorithm serves to associate a setpoint voltage value with a value for the induction current of the electric motor of the take-up mandrel (when it is the take-up mandrel that opposes resistance), which current value is previously obtained in particular by taking account of the mean radius of the mandrel. The algorithm may be re-evaluated where necessary when errors appear between the setpoint tension and a real tension as measured during maintenance operations with the help of a dynamometer connected by belts to the take-up mandrel and to the impregnation mandrel.

It should be observed that the setpoint tension varies as a function in particular of the nature of the fibers constituting the fiber texture to be wound onto the impregnation mandrel and on parameters used while weaving it.

By way of example, for a fiber texture constituted by an interlock type three-dimensional multilayer fabric made of carbon fibers of intermediate modulus, a setpoint tension should be applied that is of the order of 6000 newtons (N) with the fabric traveling at a winding speed lying in the range 200 millimeters per minute (mm/min) to 400 mm/min. For this particular fiber texture, such values make it possible to obtain an appropriate level of compacting of the superposed layers of fiber texture on the impregnation mandrel. This results in well-controlled fiber density for the final preform that is obtained at the end of the subsequent resin impregnation step.

In the invention, provision is made to correct automatically any lack of alignment between the take-up mandrel and the impregnation mandrel that might occur during the operation of winding the fiber texture onto the impregnation mandrel.

Figure 3:
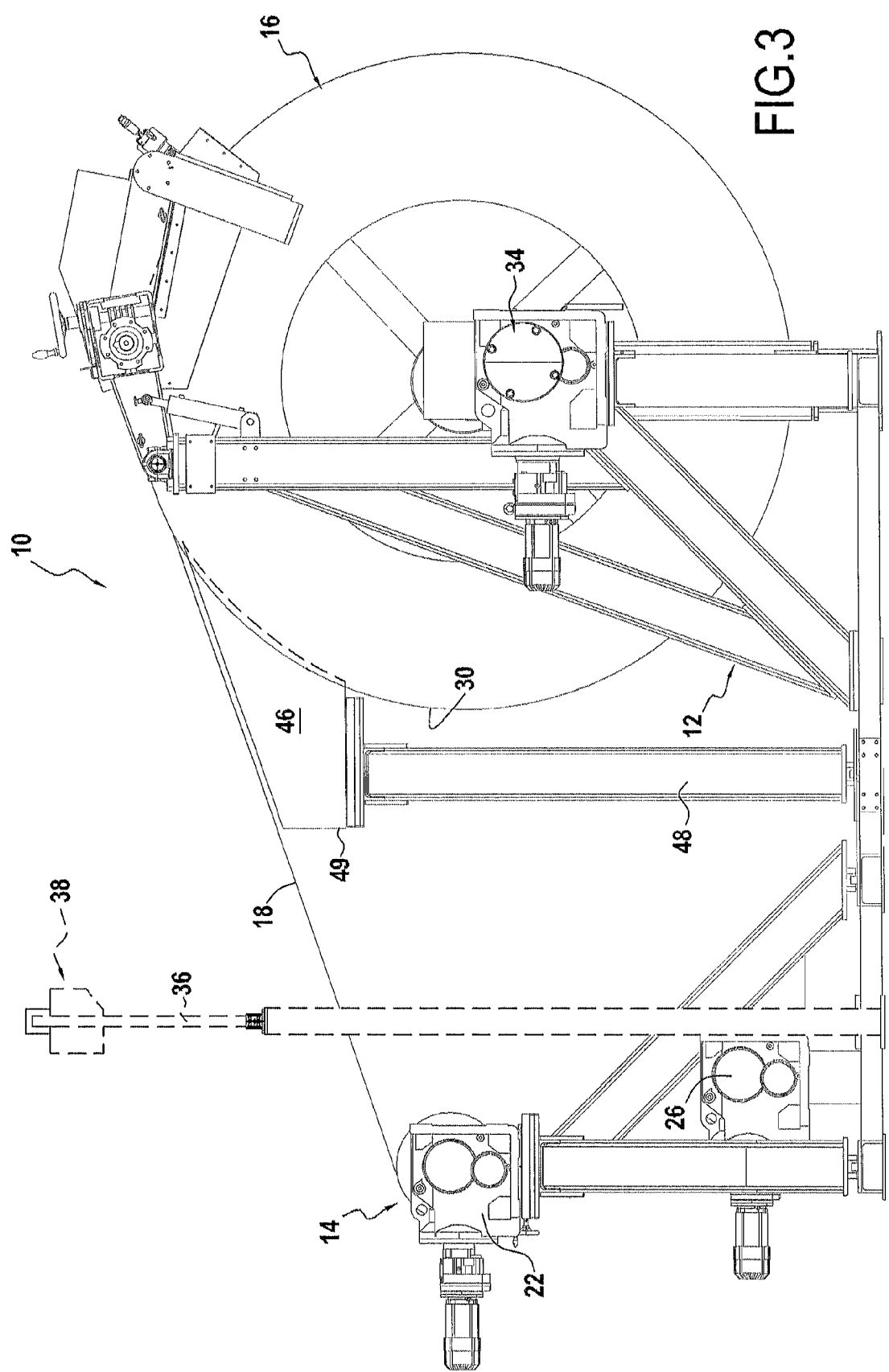
FIG. 3 is a side view of the winding machine of FIG. 1 or FIG. 2 without its control unit.

To this end, and as shown in FIG. 3, the camera 46 that preferably points to the underneath of the fiber texture during winding, towards both the fiber texture 18 and the impregnation mandrel 16, continuously records the travel of the tracer yarns of this fiber texture. Preferably, the camera is incorporated in a light box 49 that is adjusted to the profile of the mandrel and placed as close as possible to the fiber texture. This arrangement indeed makes it possible to optimize the contrast between the tracer yarns made up of strands of glass fibers or of a glass-carbon assembly and the fiber texture constituted only of carbon fibers, by avoiding ambient or parasitic lighting from the workshop above the machine. The camera 46 is connected to the control unit 42 of the winding machine, which unit includes image-analysis software 47 in order to process the digital images coming from the camera during the operation of winding the fiber texture.

The software analyzes the images of the fiber texture continuously and in real time during winding in order to measure the position error between a reference position (or theoretical alignment position) and the real position of the warp tracer(s) 44 present on the fiber texture. The control reference point is settable using the image-analysis software. It combines selecting the tracer(s) to be monitored and also the authorized position tolerance. The value of this tolerance is preferably specified in millimeters.

Figure 4:
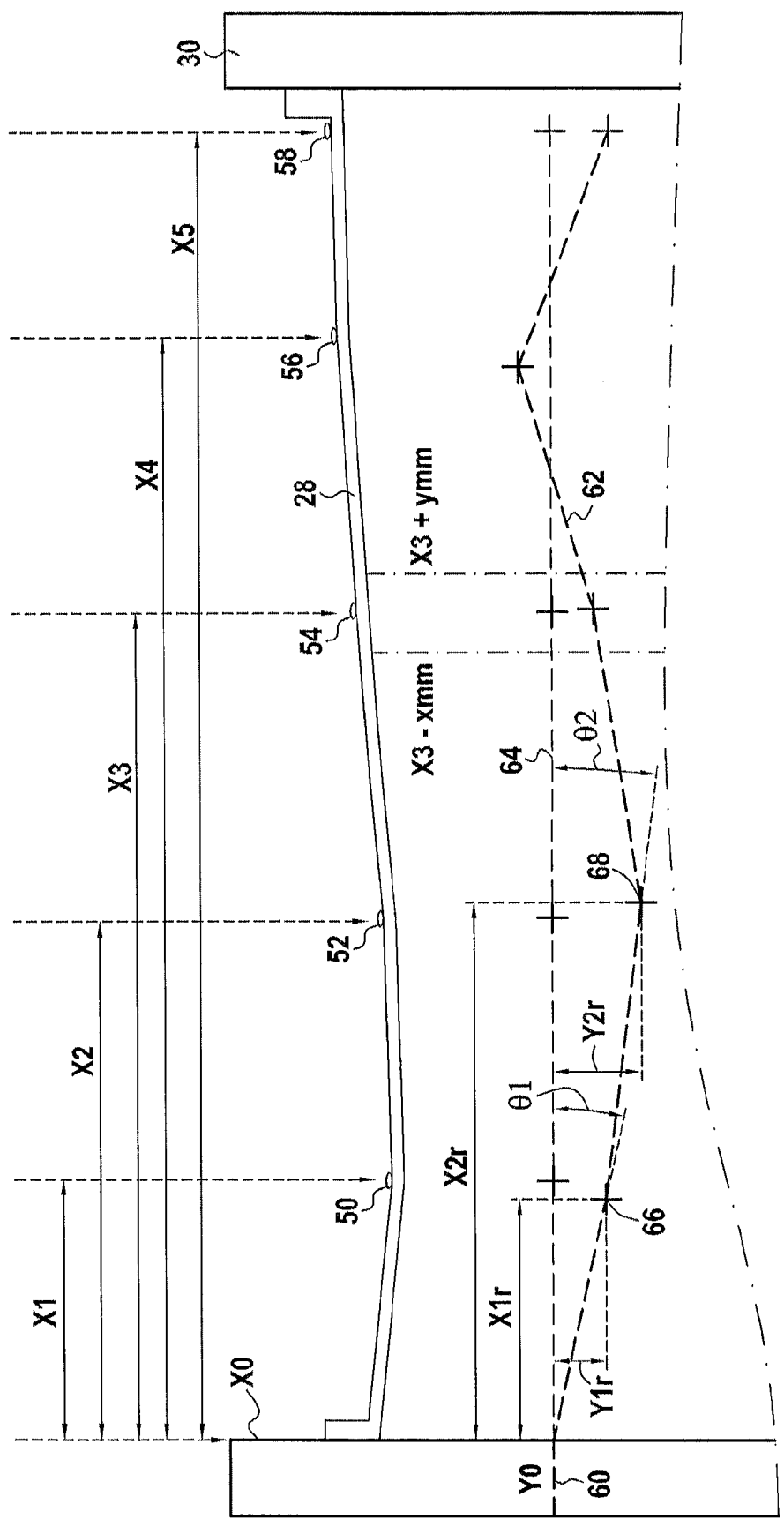
FIG. 4 is an external view of the fiber texture showing its various tracer yarns.

FIG. 4 shows a fiber texture 18 comprising five tracer warp yarns 50, 52, 54, 56, 58 having theoretical positions X1, X2, X3, X4, X5 that are defined relative to a target that is engraved or machined onto the impregnation mandrel, or that is preferably constituted by a geometrical characteristic of the mandrel, such as the inside edge of a side plate 30 (reference X0) that the image-analysis software can recognize easily.

For example, if it is decided to use the theoretical position X3 of the third warp tracer 54 in order to monitor the alignment, it would be advisable to set an authorized position error on either side of this theoretical position (±x y mm). Thus, the system allows winding to continue without correcting position as long as the tracer yarn remains within the position error range (X3−x mm) and (X3+y mm), x and y possibly being equal. The position error is measured at a settable sampling rate (for example: $1/30^{th}$ with ¼ of a turn every z mm of linear travel).

It should be noted that within the context of the embodiment of FIG. 2, the alignment reference is no longer constituted by a characteristic of the mandrel but by the theoretical position(s) of warp and weft tracer yarns having references C1, C2, C3, and T1 as recorded during the above-mentioned calibration stage. When only one tracer yarn is used for alignment (the position of the other tracer yarns is naturally recorded even if it is not taken into account for alignment purposes), it is preferably situated in a particular zone of the fiber texture, for example the retention zone.

Conditions for continuing winding could however be set more finely in order to enable mid-course corrections as a function of the percentage of error measured relative to the theoretical position by incorporating a proportional-integral-derivative (PID) function, in the position correction order. By way of example, as long as the position error is less than 25% of the tolerance range (i.e. 1 mm for a position error equal to 4 mm, for example), no compensation of trajectory is necessary. Beyond an error of 25%, trajectory correction is performed by correcting the position of the take-up mandrel 14. The PID function needs to take account of the response time of the system of correction in order to continue (or not) adjusting the position of the take-up mandrel so as to avoid maintaining a positive or negative unbalanced position relative to the target value.

This position-adjustment sensitivity could be set, e.g. in seconds, i.e. the image analysis software takes account of values measured every k seconds, in order to calculate the correction value. The adjustment value for this time measurement is set to lie in the range 0 to 30 seconds, for example, without however exceeding the time that is necessary for the machine to wind through half a turn.

The position of the take-up mandrel is corrected by moving its support frame in translation by means of the motorized wormscrew 24. The data necessary for position correction comes directly from the image-analysis software and is converted into signals making it possible to control the electric motor 26 for moving the wormscrew. This software also makes it possible to publish an inspection report that gives details of the values of the corrections made to the position of the take-up mandrel for the entire winding operation.

Figure 5:
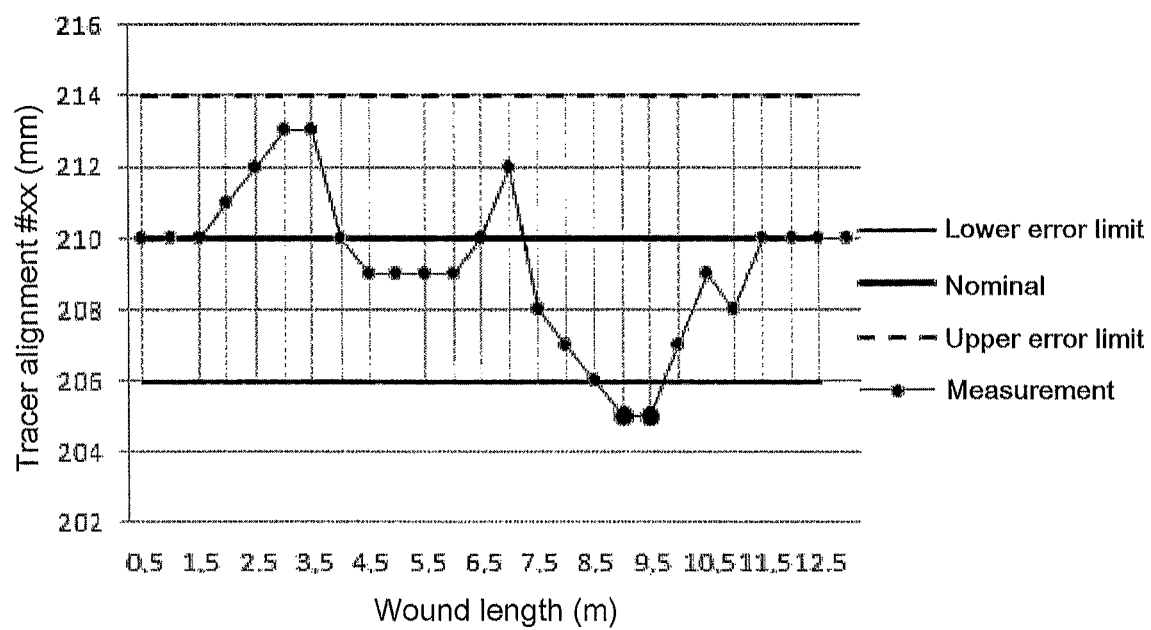
FIG. 5 shows a graph illustrating inspection of the alignment of the fiber texture.

In the example inspection report shown in FIG. 5, the graph shows the alignment position, for example of the tracer yarn 54, every 0.5 meters during winding. The large points (two in this example) show out-of-tolerance measurements that reveal a misalignment that could not be corrected temporarily by the correction system. These points are thus clearly identified in the inspection report so as to allow the inspector checking the quality of the finished preform to come to a conclusion about the acceptability of the winding operation.

However, this verification of the alignment of the fiber texture during winding is not sufficient to guarantee that the finished preform is in compliance with the required specifications. It is also necessary to measure continuously the offset of the fiber texture by examining the variation in the straightness of the weft yarns during winding.

In accordance with the invention, this function is consequently provided by the same camera 46 and the same image-analysis software module as used for correcting the alignment of the fiber texture.

It should be noted that the offset value is expressed in degrees relative to the theoretical alignment (axial direction) of the weft tracers. In order to characterize the offset value, the image-analysis software makes it possible to measure the position of the intersections of the warp tracers with the weft tracers. The theoretical positions of the intersections is defined by the coordinates $(X_n, Y_n)$, and the origins X0 and Y0 are taken, for the embodiment of FIG. 1, at reference points of the impregnation mandrel 16 (the inside edge of the side plate 30 as described above for the origin X0 and a line 60 that is engraved on said side plate for reference Y0), and for the embodiment of FIG. 2, along a horizontal reference line of the weft tracer T1 of the calibration mandrel 45. The reference Y0 corresponds to the positioning of the first weft tracer situated at the start of the winding. The positions of the following weft tracers can be expressed in linear distance relative to the starting position Y0 or as an angular position between the start of winding and the end of said winding after 4 turns.

The image-analysis software makes it possible to identify each weft tracer 62 during winding when it arrives in the examination window of the camera 46 and to measure for each weft/warp tracer intersection the error measured relative to the theoretical position of a reference weft tracer 64 as well as the offset value. Furthermore, the software makes it possible to inform the operator in real time of the offset value in order to enable said operator to identify possible drift of the winding operation. If desired, the operator may possibly correct this offset by varying the tension setting (+ or −) on the preform as a function of the location of maximum offset. By way of example, if an offset zone is observed that is due to a peak in tension in the preform, the operator can reduce the tension setting in order to reduce the offset, providing the tension setting remains within the manufacturing tolerance desired, e.g. ±10%. A visual or audible alarm advantageously makes it possible to signal any such drift in the winding quickly to the operator.

Returning to FIG. 4, the offset value at the real point of intersection 66 between the first warp tracer and the first weft tracer, is given in degrees (θ1) relative to the theoretical orientation of said first weft tracer. The offset value at the real point of intersection 68 between the second warp tracer and the first weft tracer is given in the same way, in degrees (θ2) corresponding to the orientation error of the weft yarn between the real point 66 and the real point 68, always in comparison with the theoretical orientation of the weft tracer.

In the same way as for monitoring alignment, the image-analysis software also makes it possible to produce an inspection report that gives details for each weft tracer, about the real position of intersection and the offset angle, thus showing how offset varies during the entire winding operation, this measurement being absolutely necessary in order to decide on the final quality of the preform after winding. The recording carried out in this way makes it possible to come to a conclusion about the acceptability (or unacceptability) of the preform for continuing the fabrication process of the casing.

Figure 6:
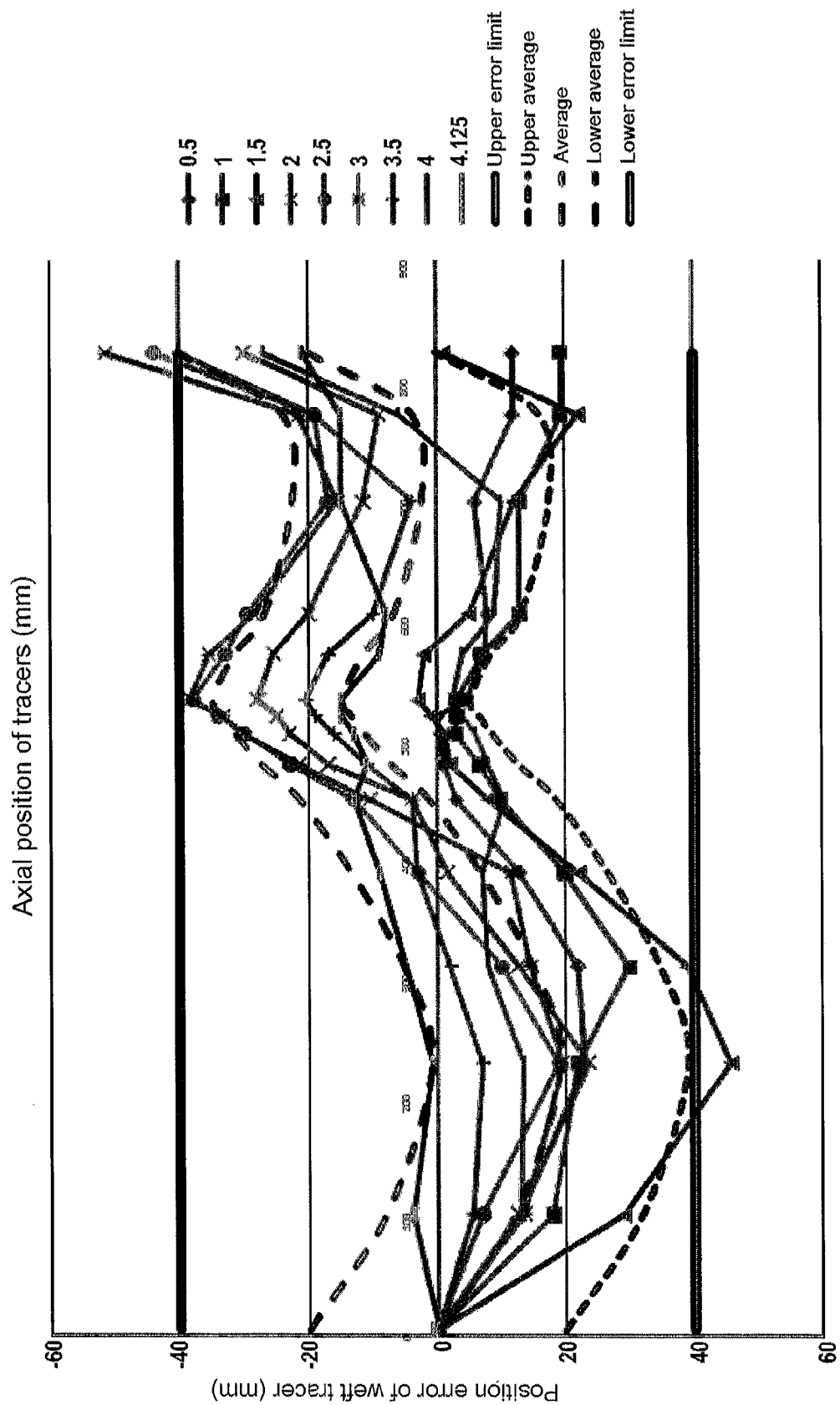
FIG. 6 shows a graph illustrating control of the offset of the fiber texture.

In the example inspection report shown in FIG. 6, the graph shows the offset that the image-analysis software is able to generate in real time. The upper and lower limits show the maximum and minimum authorized error relative to the theoretical position of a weft tracer of a fiber texture that is not offset, i.e. for example ±40 mm. The upper and lower averages give the authorized limits for the dispersion of the entire set of tracers around the mean position of the tracers taken at a single axial position, i.e. for example ±20 mm. Naturally, these limit values and upper and lower averages can be set.

It should be observed that although the above description shows only one take-up mandrel, it is clear that the winding machine of the invention can also include an additional mandrel storing a reinforcing fiber fabric carried by a horizontal axis parallel to the respective axes of rotation of the take-up and impregnation mandrels for winding synchronously with the fiber texture. By way of example, the reinforcing fiber fabric may be an interlock type three-dimensional multilayer fabric made of carbon fibers of intermediate modulus or of any other woven, braided, or unidirectional fiber reinforcement.

In order to facilitate shaping and compaction on the impregnation mandrel, the winding machine may also include heater units (e.g. radiant or blow heaters) and means for spraying the fiber texture prior to docking it on the impregnation mandrel.

Finally, it should be observed that although the present description concentrates primarily on a winding machine, it is clear that the method of the invention for controlling the alignment and offset of the tracers on the fiber texture also finds application to monitoring prior weaving of the texture on a weaving machine or loom downstream from its pull mandrel, simply by providing the loom, at one of its other mandrels, e.g. its take-up mandrel, with a camera and its associated image-analysis module.

The invention claimed is:

1. A machine for winding a fiber texture onto an impregnation mandrel, the machine comprising:
    a take-up mandrel for storing and unwinding a fiber texture, the take-up mandrel having a substantially horizontal axis of rotation;
    an impregnation mandrel for receiving superposed layers of the fiber texture unwound from the take-up mandrel, the impregnation mandrel having an axis of rotation that is substantially horizontal and parallel to the axis of rotation of the take-up mandrel;
    a camera mounted in a light box that is adjusted to a profile of said impregnation mandrel and placed as close as possible to said fiber texture for avoiding ambient parasitic lighting, and directed towards the fiber texture and the impregnation mandrel in order to examine passage of warp tracer yarns and weft tracer yarns present in the fiber texture;
    an image-analysis module for initially determining positions of intersections of warp tracer yarns with successive weft tracer yarns and then comparing the determined positions with corresponding theoretical positions for the intersections of reference warp and weft tracer yarns and, for determining an offset value for the fiber texture for each of these intersections;
    electric motors for driving the take-up and impregnation mandrels in rotation about their respective axes of rotation; and
    a control unit for controlling the electric motors for driving rotation of the take-up and impregnation mandrels and adjusting one or more parameters of the machine to correct the offset value.

2. A machine according to claim 1, wherein the control unit for controlling the electric motors includes monitoring means for monitoring the tension of the fiber texture.

3. A machine according to claim 1, wherein the image-analysis module records said theoretical positions for the intersections of reference warp and weft as detected, during a calibration stage prior to automatic winding of said fiber texture, by said camera acting on a calibration mandrel marked with reference warp and weft tracer yarns.

4. A machine according to claim 1, wherein the image-analysis module further determines a position error between a reference alignment position and the position observed by the camera of at least one warp tracer yarn and optionally allows continuation of winding depending on whether or not the observed position of the tracer yarn remains within a predetermined tolerance range.

5. A machine according to claim 4, wherein the control unit corrects alignment during the winding operation by correcting the position of the take-up mandrel when the position error is greater than 25% of the predetermined tolerance range.

6. A machine according to claim 5, wherein the position of the take-up mandrel is corrected by a motorized wormscrew secured to the take-up mandrel.

7. A method of determining an offset value for a fiber texture wound in superposed layers onto a second mandrel of a machine including a first mandrel for storing and unwinding said fiber texture, the first mandrel having an axis of rotation that is substantially horizontal and parallel to an axis of rotation of the second mandrel, and the first and second mandrels being driven about their respective axes of rotation by electric motors actuated by a control unit, the method comprising examining, with a camera mounted in a light box that is adjusted to the profile of said impregnation mandrel and placed as close as possible to said fiber texture, and directed towards the fiber texture and the second mandrel, the passage of warp tracer yarns and weft tracer yarns that are present in the fiber texture; determining with an image-analysis module firstly positions of the intersections of the warp tracer yarns with successive weft tracer yarns; comparing with the image-analysis module the determined positions with corresponding theoretical positions of the intersections of reference warp and weft tracer yarns; determining with the image-analysis module an offset value for the fiber texture for each of the intersections, and adjusting one or more parameters of the machine to correct the offset value.

8. A method according to claim 7, wherein said first and second mandrels are respectively take-up mandrels and impregnation mandrels for a winding machine.

9. A method according to claim 7, wherein said first and second mandrels are respectively a pull mandrel and a take-up mandrel for a weaving machine or loom.

10. A method according to claim 7, wherein said theoretical positions of the intersections of reference warp and weft tracer yarns are detected during a calibration stage prior to automatic winding of said fiber texture, by said camera on a calibration mandrel marked with reference warp and weft tracer yarns and recorded in said image-analysis module.

11. A method according to claim 7, wherein the adjusting includes varying a tension setting on the fiber texture as a function of a location of a maximum offset.

\* \* \* \* \*